United States Patent
Adachi et al.

(10) Patent No.: US 11,084,469 B2
(45) Date of Patent: Aug. 10, 2021

(54) VEHICULAR CONTROL APPARATUS

(71) Applicant: HONDA MOTOR CO., LTD., Tokyo (JP)

(72) Inventors: Takashi Adachi, Wako (JP); Hisashi Ishikawa, Wako (JP); Takayuki Kishi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 256 days.

(21) Appl. No.: 16/173,046

(22) Filed: Oct. 29, 2018

(65) Prior Publication Data
US 2019/0126895 A1    May 2, 2019

(30) Foreign Application Priority Data

Nov. 1, 2017  (JP) .............................. JP2017-212029

(51) Int. Cl.
| | |
|---|---|
| B60T 8/175 | (2006.01) |
| B60L 15/20 | (2006.01) |
| B60T 8/58 | (2006.01) |
| B60T 8/32 | (2006.01) |
| B60W 10/18 | (2012.01) |
| B60W 30/18 | (2012.01) |
| B60T 8/48 | (2006.01) |

(52) U.S. Cl.
CPC .......... *B60T 8/175* (2013.01); *B60L 15/2009* (2013.01); *B60T 8/3205* (2013.01); *B60T 8/58* (2013.01); *B60T 8/48* (2013.01); *B60T 2270/208* (2013.01); *B60W 10/18* (2013.01); *B60W 30/18172* (2013.01); *B60W 2520/28* (2013.01); *B60W 2540/10* (2013.01); *B60W 2540/12* (2013.01); *B60W 2710/18* (2013.01)

(58) Field of Classification Search
None
See application file for complete search history.

(56) References Cited

U.S. PATENT DOCUMENTS

| | | | | |
|---|---|---|---|---|
| 4,823,269 | A | * | 4/1989 | Fujioka ..................... B60T 8/48 701/90 |
| 4,854,411 | A | * | 8/1989 | Ise ....................... B60T 8/17616 180/197 |
| 4,955,449 | A | * | 9/1990 | Hilburger ................ B60T 8/175 180/197 |

(Continued)

FOREIGN PATENT DOCUMENTS

| | | |
|---|---|---|
| JP | 2005-047314 A | 2/2005 |
| JP | 2008-149742 A | 7/2008 |

*Primary Examiner* — Thomas E Worden
(74) *Attorney, Agent, or Firm* — Rankin, Hill & Clark LLP

(57) ABSTRACT

A vehicular control apparatus includes: a drive power control unit that controls drive power from a drive unit that drives drive wheels of a vehicle; a brake switch (a brake action detection unit) that detects a brake action performed on a brake unit, the brake action including decelerating and stopping the vehicle; a wheelspin detection unit that detects spinning of the drive wheels; a time measurement unit that, when the drive wheels being stopped start to rotate, measures time elapsed since the start of the rotation; and a control unit that enables the wheelspin detection unit to perform detection after a preset detection disabled period elapses since the time measurement unit has started measuring the time.

2 Claims, 8 Drawing Sheets

(56) References Cited

U.S. PATENT DOCUMENTS

| | | | | |
|---|---|---|---|---|
| 5,455,771 A | * | 10/1995 | Fujioka | B60T 8/175 701/92 |
| 6,059,065 A | * | 5/2000 | Takeda | B60K 23/04 180/244 |
| 6,606,549 B1 | * | 8/2003 | Murakami | B60K 17/35 180/248 |
| 6,846,268 B2 | * | 1/2005 | Schmitt | B60K 28/165 477/83 |
| 8,244,443 B2 | * | 8/2012 | Oshima | B60T 8/1706 701/71 |
| 8,538,635 B2 | * | 9/2013 | Uematsu | B60T 8/1769 701/48 |
| 8,989,969 B2 | * | 3/2015 | Uematsu | F02D 29/02 701/50 |
| 9,327,695 B2 | * | 5/2016 | Lauser | B60T 7/042 |
| 2003/0018425 A1 | * | 1/2003 | Gronau | B60T 8/175 701/71 |
| 2008/0245591 A1 | * | 10/2008 | Sjogren | B60T 8/175 180/197 |
| 2013/0274980 A1 | * | 10/2013 | Takamura | B60W 10/08 701/22 |
| 2015/0127232 A1 | * | 5/2015 | Hamamura | B60K 28/16 701/67 |

\* cited by examiner

WHEELS LOCK UP ON LOW μ ROAD AND ACCELERATION IS APPLIED IMMEDIATELY AFTER RELEASE OF BRAKE

REGULAR START ON LOW μ ROAD

VEHICULAR CONTROL APPARATUS

BACKGROUND OF THE INVENTION

1. Field of the Invention

The present invention relates to a vehicular control apparatus that controls the drive power of a drive wheel.

2. Description of the Related Art

When a drive wheel spins, i.e., in the event of wheelspin, excessive load suddenly acts on a power transmission system such as a differential gear, which may make an occupant feel awkward or cause a malfunction in the vehicle. Thus, it has been a conventional practice in the event of wheelspin to apply an appropriate braking force to the drive wheel in order to resolve the wheelspin immediately (such control is called vehicle behavior stabilizing control).

For example, in a widely used method for wheelspin detection, occurrence of a wheelspin is detected based on the speed difference between the vehicle speed and the rotational speed of a drive wheel on the assumption that the rotational speed of a non-drive wheel is the vehicle speed.

Such a detection method fails to detect a wheelspin when a wheel speed sensor that measures the rotational speed of a wheel is broken or when there is trouble in the communication with a brake ECU.

Thus, Japanese Patent Application Publication No. 2005-47314 proposes a method for determining occurrence of a wheelspin based not on the wheel speeds, but on a change in the number of revolutions of either a drive axle or a motor.

Meanwhile, Japanese Patent Application Publication No. 2008-149742 proposes methods to be performed in the event of wheelspin, the methods including not only a method of performing vehicle behavior stabilizing control to apply a braking force to the drive wheel, but also a control method of restricting drive power in case of failure of the vehicle behavior stabilizing control.

For example, assume a situation where the wheels lock as a result of application of the brake on a low μ road and the driver hurriedly releases the brake. In this situation, the wheels follow the vehicle speed, with their rotational speed accelerating from a stopped state to the vehicle speed.

In such a case, the wheels start rotating under hard acceleration, and the control unit may erroneously detect a wheelspin.

Then, when the wheels' following the vehicle speed is erroneously detected as a wheelspin, even though a wheelspin is not occurring, the vehicle behavior stabilizing control is performed to restrict drive power with an aim to protect the power transmission system. Then, because of the braking force thus applied, the driver cannot accelerate the vehicle even if the driver steps on the acceleration pedal, and consequently, may feel some awkwardness.

SUMMARY OF THE INVENTION

The present invention has been made in view of the above points, and has an object to provide a vehicular control apparatus capable of reducing erroneous detection of wheelspins.

To achieve the above object, a vehicular control apparatus according to the present invention comprises: a drive power control unit that controls drive power from a drive unit that drives a drive wheel of a vehicle; a brake action detection unit that detects a brake action performed on a brake unit, the brake action including decelerating and stopping the vehicle; a wheelspin detection unit that detects spinning of the drive wheel; a time measurement unit that, when the drive wheel being stopped starts to rotate, measures time elapsed since the start of the rotation; and a control unit that enables the wheelspin detection unit to perform detection after a preset detection disabled period elapses since the time measurement unit has started measuring the time.

The present invention can provide a vehicular control apparatus capable of reducing erroneous detection of wheelspins.

DETAILED DESCRIPTION OF THE EMBODIMENTS

An embodiment of the present invention will be described in detail with reference to the drawings where necessary. The same constituents are denoted by the same reference signs to omit repeated descriptions.

<1. Configuration of a Vehicle in which a Vehicular Control Apparatus is Installed>

Figure 1:
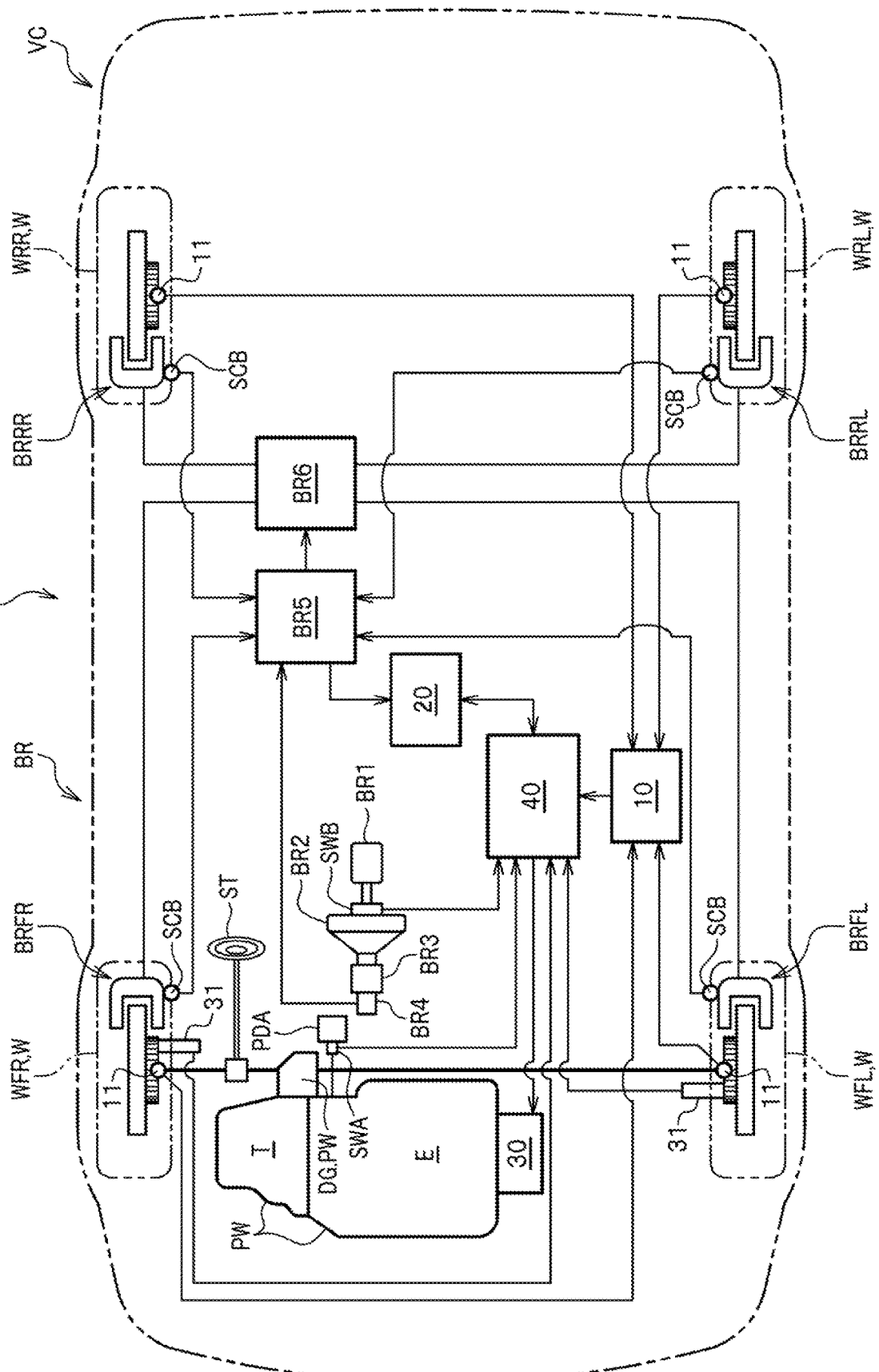
FIG. 1 is a schematic diagram illustrating a vehicle equipped with a vehicular control apparatus according to the present embodiment.

As illustrated in FIG. 1, a vehicle VC equipped with a vehicular control apparatus 1 of the present embodiment includes a drive unit PW, wheels W, and a brake unit BR.

The drive unit PW is constituted by an engine E, a transmission T, and a differential gear DG. In the drive unit PW, drive power outputted from the engine E changes when the driver steps on an acceleration pedal PDA as a manipulation part. Then, the drive power produced by the engine E is transmitted to drive wheels WFL, WFR via the transmission T and the differential gear DG.

When the vehicle VC takes a turn, the differential gear DG equally transmits drive power to the left and right drive wheels WFL, WFR while generating a rotational difference between them. At the acceleration pedal PDA, an acceleration switch SWA (an acceleration action detection unit) is disposed.

The acceleration switch SWA detects how much the acceleration pedal PDA is stepped on (i.e., the amount of an acceleration action). Then, based on a change in the amount of an acceleration action performed on the acceleration switch SWA, the acceleration switch SWA detects an action of stepping on the acceleration pedal PDA (an acceleration/cruising action) (an ON action) and end of an acceleration/cruising action (an OFF operation).

Note that the technique of the invention of the present application is not limited to vehicles whose power source is the engine E, but is applicable to vehicles using other power sources such as an electric motor.

The wheels W are constituted by the drive wheels WFL, WFR and non-drive wheels WRL, WRR. In the present embodiment, the vehicle VC equipped with the vehicular control apparatus 1 is what is called a front-wheel drive vehicle. Thus, the left and right front wheels are the drive wheels WFL, WFR, and the left and right rear wheels are the non-drive wheels WRL, WRR.

Drive power of the engine E is transmitted to the drive wheels WFL, WFR (the left and right front wheels) via the differential gear DG. Further, the left and right front wheels (the drive wheels WFL, WFR) also function as wheels for steering, and steer the vehicle as the driver turns a steering wheel ST (a steering unit).

While the vehicle is running, the non-drive wheels WRL, WRR (the left and right rear wheels) are rotated by the force of friction with the road surface.

Note that the invention of the present application is not limited to vehicles whose drive wheels are the front wheels, and is also applicable to vehicles whose drive wheels are the rear wheels or all the wheels W.

As illustrated in FIG. 1, the brake unit BR includes a brake pedal BR1, an electronically-controlled vacuum booster BR2, a master cylinder BR3, a hydraulic pressure control unit BR4, and brake calipers BRFL, BRFR, BRRL, BRRR.

The brake pedal BR1 is a manipulation part (a brake manipulation part) used by the driver to perform a brake action, and is connected to the master cylinder BR3 via the electronically-controlled vacuum booster BR2.

The master cylinder BR3 is connected, via the hydraulic pressure control unit BR4, to the brake calipers BRFL, BRFR, BRRL, BRRR provided respectively for the drive wheels WFL, WFR and the non-drive wheels WRL, WRR. Further, a brake switch SWB (a brake action detection unit) is disposed at the brake pedal BR1.

The brake switch SWB detects how much the brake pedal BR1 is stepped on (the amount of a brake action). Then, based on the amount of a brake action performed on the brake switch SWB, the brake switch SWB detects an action of stepping on the brake switch SWB (a brake action) (an ON action) and end of a brake action (an OFF action).

The electronically-controlled vacuum booster BR2 mechanically doubles the stepping power of the brake pedal BR1 and actuates the master cylinder BR3. Further, during automated braking by the Vehicle Stability Assist (VSA) (vehicle behavior stabilizing control system), the electronically-controlled vacuum booster BR2 actuates the master cylinder BR3 not in response to an action performed on the brake pedal BR1, but in response to a control signal from a braking force control unit BR5 to be described later.

The hydraulic pressure control unit BR4 includes a pressure adjuster BR6 for the brake calipers BRFL, BRFR, BRRL, BRRR.

The pressure adjuster BR6 includes braking force detection units SCB that detect braking forces outputted from the brake calipers BRFL, BRFR, BRRL, BRRR, respectively. Then, while detecting braking forces with the braking force detection units SCB, the pressure adjuster BR6 individually controls the brake calipers BRFL, BRFR, BRRL, BRRR provided for the respective wheels W as instructed by the braking force control unit BR5. Thereby, anti-lock braking control can be performed to prevent the wheels W from locking up in the event of sudden braking. Further, since different levels of braking forces are generated for the wheels W, the yaw moment of the vehicle is controlled appropriately to stabilize the vehicle behavior during a turn.

<2. Configuration of the Vehicular Control Apparatus>

The vehicular control apparatus 1 of the present embodiment has a function to resolve a wheelspin speedily after detecting the wheelspin.

As illustrated in FIG. 1, the vehicular control apparatus 1 of the present embodiment includes a wheelspin detection unit 10, a time measurement unit 20, a drive power control unit 30, and a control unit 40.

The wheelspin detection unit 10 includes rotational speed sensors 11.

The rotational speed sensors 11 are disposed for the respective wheels W and detect the rotational speeds of the wheels W.

The wheelspin detection unit 10 compares the rotational speeds of the front drive wheels WFL, WFR with the rotational speeds of the rear non-drive wheels WRL, WRR to determine the rotational speed difference. When finding as a result of the rotational speeds comparison that the rotational speed difference is equal to or above a set value, the wheelspin detection unit 10 determines that a wheelspin is occurring.

In addition, in the present embodiment, the vehicle speed is calculated based on the rotational speeds of the rear non-drive wheels WRL, WRR.

When the drive wheels WFL, WFR start rotating from a stopped state, the time measurement unit 20 measures the time elapsed since the start of the rotation.

The drive power control unit 30 includes the VSA described earlier. The drive power control unit 30 reduces drive power to transmit to the wheels W by giving a braking force to each of the wheels W or by forcibly reducing the output from the engine E. This stabilizes the behavior of the vehicle VC which has become unstable due to a skid or the like while the vehicle is running.

To be more specific, the state of the vehicle VC is compared with the drive power detected (a final target drive power value), and if the behavior of the vehicle VC is unstable, based on the state of the vehicle VC, a braking force is given to the wheel W the drive power for which is to be reduced. To this end, the drive power control unit 30 includes a drive power detection unit 31 for each of the drive wheels WFL, WFR.

The drive power detection unit 31 constantly detects the drive power outputted from the engine E, irrespective of whether it is during a detection disabled period to be described later or not.

After a preset detection disabled period elapses since the time measurement unit 20 has started measuring time, the control unit 40 enables the wheelspin detection unit 10 to detect wheelspins.

The detection disabled period is a period of time the length of which is set variously depending on the state of the vehicle VC.

The detection disabled period is set for the following reason, for example. When the brake is applied while the vehicle is running on a low μ road, the wheels W may lock up due to a fault in the VSA preventing activation of an Anti-lock Braking System (ABS) constituting the VSA. Note that a low μ road refers to a road surface having a smaller coefficient of friction than a road surface of a general dry paved road, and is for example a road surface which is wet from rain, covered with snow, or frozen.

When the driver stops applying the brake under such a circumstance, the wheels W are unlocked and start rotating again due to the force of friction with the road surface, and the rotational speed speedily follows the vehicle speed (follow-up acceleration). When the wheels W thus rotate following the vehicle speed, the acceleration is larger than normal acceleration of the vehicle.

However, the follow-up acceleration is different from a wheelspin because the wheels W are not spinning, and therefore does not require restriction on the drive power to resolve the spinning.

Thus, in the invention of the present application, a detection disabled period is set to disable wheelspin detection during the detection disabled period. Then, after the detection disabled period elapses, i.e., after the follow-up acceleration resolves, wheelspin detection is performed. This way, follow-up acceleration is not detected as a wheelspin.

Note that if the VSA (ABS) is activated normally, the wheels W will not be locked by sudden braking on a low μ road.

Further, if a fault in the VSA causes a wheelspin in the event of a stall start, a detection disabled period is set to be shorter than for follow-up acceleration so as to resolve the wheelspin quickly.

In other words, the larger the drive power detected by the drive power detection unit 31 is, the shorter the detection disabled period is set.

A stall start is a takeoff method in which the driver of a vehicle with an automatic transmission gives full throttle with their foot stepping on the brake pedal BR1 and, when the number of revolutions of the engine becomes high (stall), removes the foot from the brake pedal BR1 to take off. In this takeoff method, the vehicle takes off with large drive power being produced, and therefore a wheelspin tends to occur.

<3. How the Vehicular Control Apparatus 1 Works>

Figure 2:
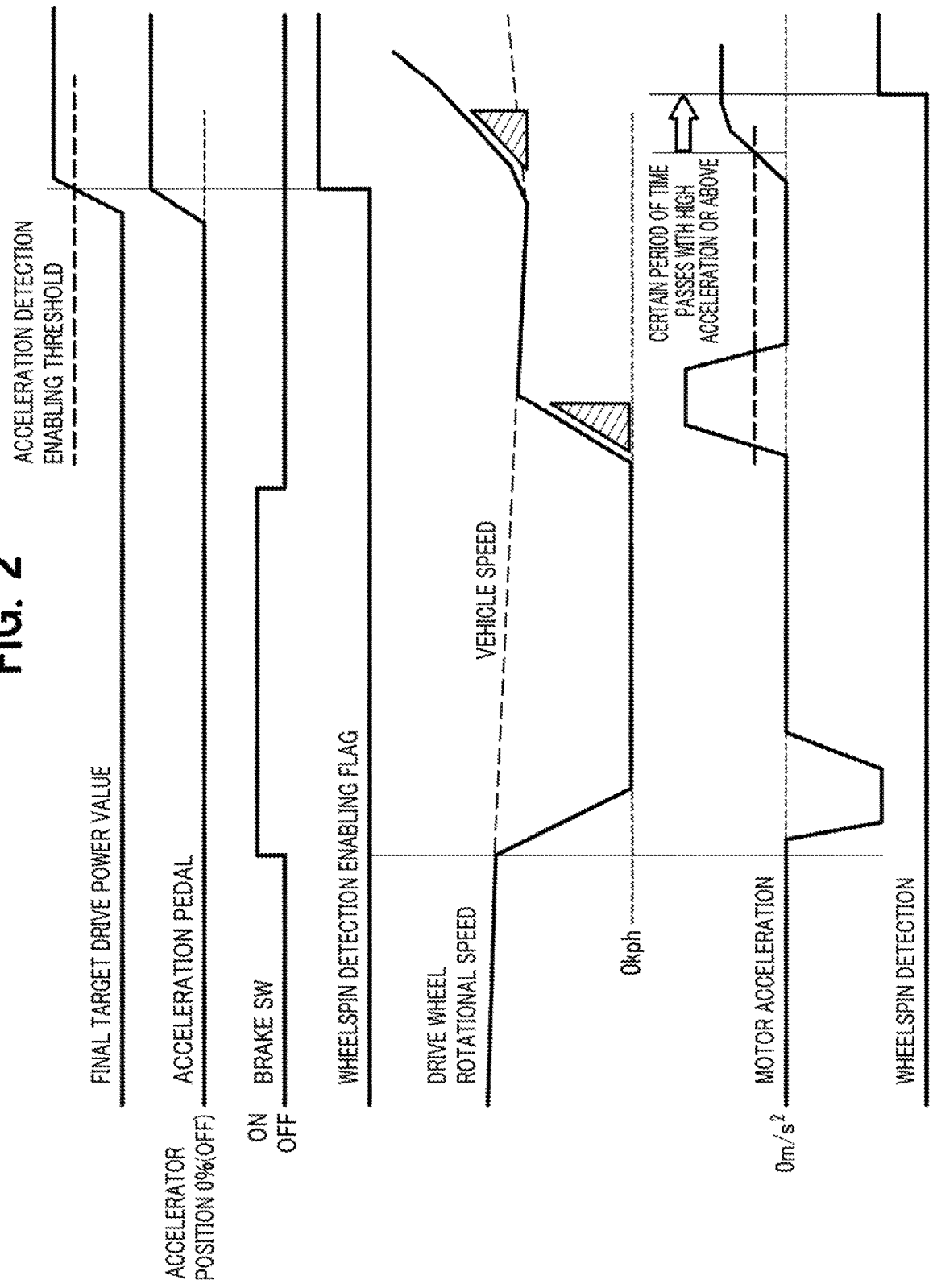
FIG. 2 is a time chart illustrating how the vehicular control apparatus according to the present embodiment works.

Next, using a time chart in FIG. 2, a description is given of how the thus-configured vehicular control apparatus 1 of the present embodiment works.

First, when the wheels W stop rotating in response to a brake action by the driver, the control unit 40 sets a detection disabled period (not shown), the length of the detection disabled period corresponding to the magnitude of drive power (a final target drive power value) detected by the drive power detection unit 31. The detection disabled period set by the control unit 40 is shorter when the drive power detected by the drive power detection unit 31 is larger.

Next, when a brake release action by the driver causes the drive wheels WFL, WFR to rotate again from a non-rotating state, the control unit 40 causes the time measurement unit 20 to measure time elapsed since the drive wheels WFL, WFR have started rotating.

Then, once the time measured by the time measurement unit 20 exceeds the detection disabled period, the control unit 40 causes the drive power detection unit 31 to detect drive power transmitted to the wheels W.

If the drive power detected after the elapse of the detection disabled period is equal to or below a preset acceleration detection enabling threshold, the control unit 40 determines that follow-up acceleration is occurring and enables an acceleration action by the driver.

In other words, the control unit 40 disables drive power restriction control by the drive power control unit 30.

Further, if the drive power detected after the elapse of the detection disabled period is above the preset acceleration detection enabling threshold, the control unit 40 enables the wheelspin detection unit 10 to detect wheelspins.

In response to the enabling command, the wheelspin detection unit 10 performs wheelspin detection. Then, if the wheels W are accelerating, the control unit 40 determines that a wheelspin is occurring.

When a wheelspin is detected, the drive power restriction control is performed and continued until a condition for canceling the drive power restriction control is satisfied (i.e., until the wheelspin is resolved).

Figure 3:
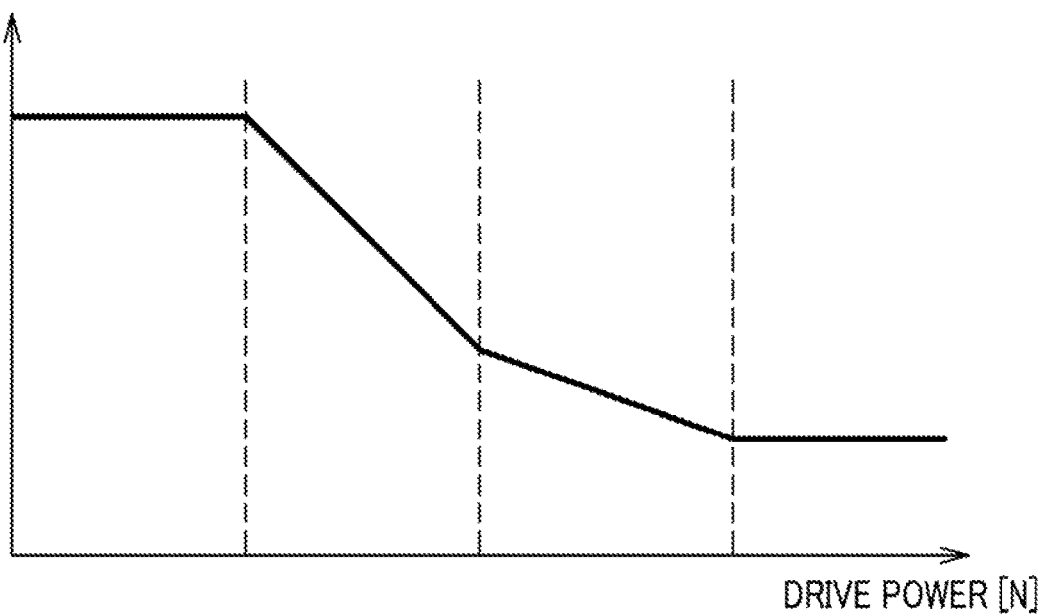
FIG. 3 is a characteristic line diagram illustrating the relation between drive power and a detection disabled period, held by a control unit.

Further, as illustrated in FIG. 3, the control unit 40 holds detection disabled periods corresponding to the magnitudes of drive power to be detected. The larger the drive power is, the shorter the detection disabled period is set.

If the driver performs an acceleration action during the detection disabled period, the current detection disabled period is compared with a detection disabled period corresponding to the drive power detected, and the shorter one of these detection disabled periods is used anew.

In other words, if the driver steps on the acceleration pedal PDA during the detection disabled period, the drive power detected becomes larger than before, and thus the detection disabled period is shortened.

Figure 4:
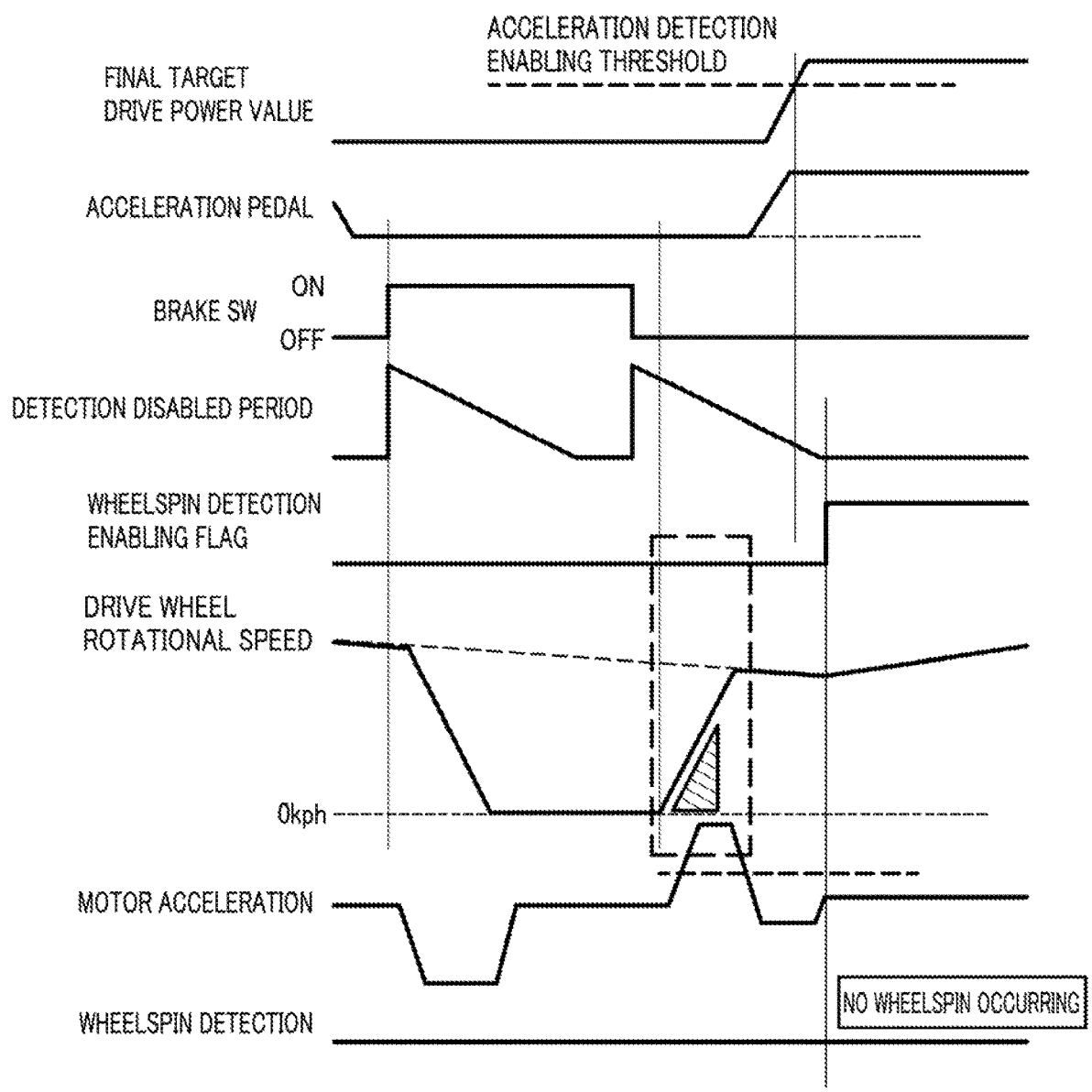
FIG. 4 is a time chart illustrating an example of how the vehicular control apparatus according to the present embodiment works.

Using a time chart in FIG. 4, a description is given of a case where the wheels lock up on a low μ road and the vehicle is accelerated some time after a brake release action.

First, while the vehicle VC is running on what is called a low μ road, the driver removes the foot from the acceleration pedal PDA and steps on the brake pedal BR1 (a brake action).

Then, the rotational speed of the wheels W decreases, and the vehicle speed lowers due to the friction with the road surface. However, since the road surface has a small coefficient of friction, the braking force prevails over the force of friction with the road surface, causing the wheels W to lock up.

Note that if the VSA is properly working, the ABS is activated and causes the brake unit BR to exert intermittent braking forces and stop the vehicle.

However, if the VSA is not working, the ABS is not activated, and the wheels W lock up, resulting in the vehicle VC sliding on the road surface.

If the driver removes the foot from the brake pedal BR1 (a brake release action) in such a sliding state, the wheels W are unlocked and start rotating again due to the friction with the road surface, and the rotational speed of the wheels W follows the vehicle speed and is accelerated (follow-up acceleration).

Meanwhile, the time measurement unit 20 starts measuring time as soon as the driver removes the foot from the brake pedal BR1 (i.e., once the brake action is ended).

At the moment the driver removes the foot from the brake pedal BR1, the foot of the driver is off the acceleration pedal PDA.

Thus, no drive power is outputted from the engine E, and therefore the control unit 40 sets the longest detection disabled period.

Then, after the detection disabled period elapses, the control unit 40 confirms that the drive power is above the acceleration detection enabling threshold and enables the wheelspin detection unit 10 to detect wheelspins.

Note that the control unit 40 continues detecting an acceleration action by the driver during the detection disabled period.

If the driver performs an acceleration action during the detection disabled period, the remaining period of the detection disabled period is compared with a detection disabled period corresponding to the drive power generated by the acceleration action.

Then, if the remaining period of the current detection disabled period is shorter than the detection disabled period corresponding to the drive power generated by the acceleration action, the control unit 40 does not replace the detection disabled period, and waits for the remaining period to elapse.

If the remaining period of the detection disabled period is longer than the detection disabled period corresponding to the drive power generated by the acceleration action, the control unit 40 replaces the current detection disabled period with the shorter detection disabled period, and waits for the new detection disabled period to elapse.

Next, after the detection disabled period elapses, the control unit 40 causes the drive power detection unit 31 to detect drive power, and compares the detected drive power with the acceleration detection enabling threshold.

Then, if the detected drive power is above the acceleration detection enabling threshold, the control unit 40 enables the wheelspin detection unit 10 to detect wheelspins.

Figure 5:
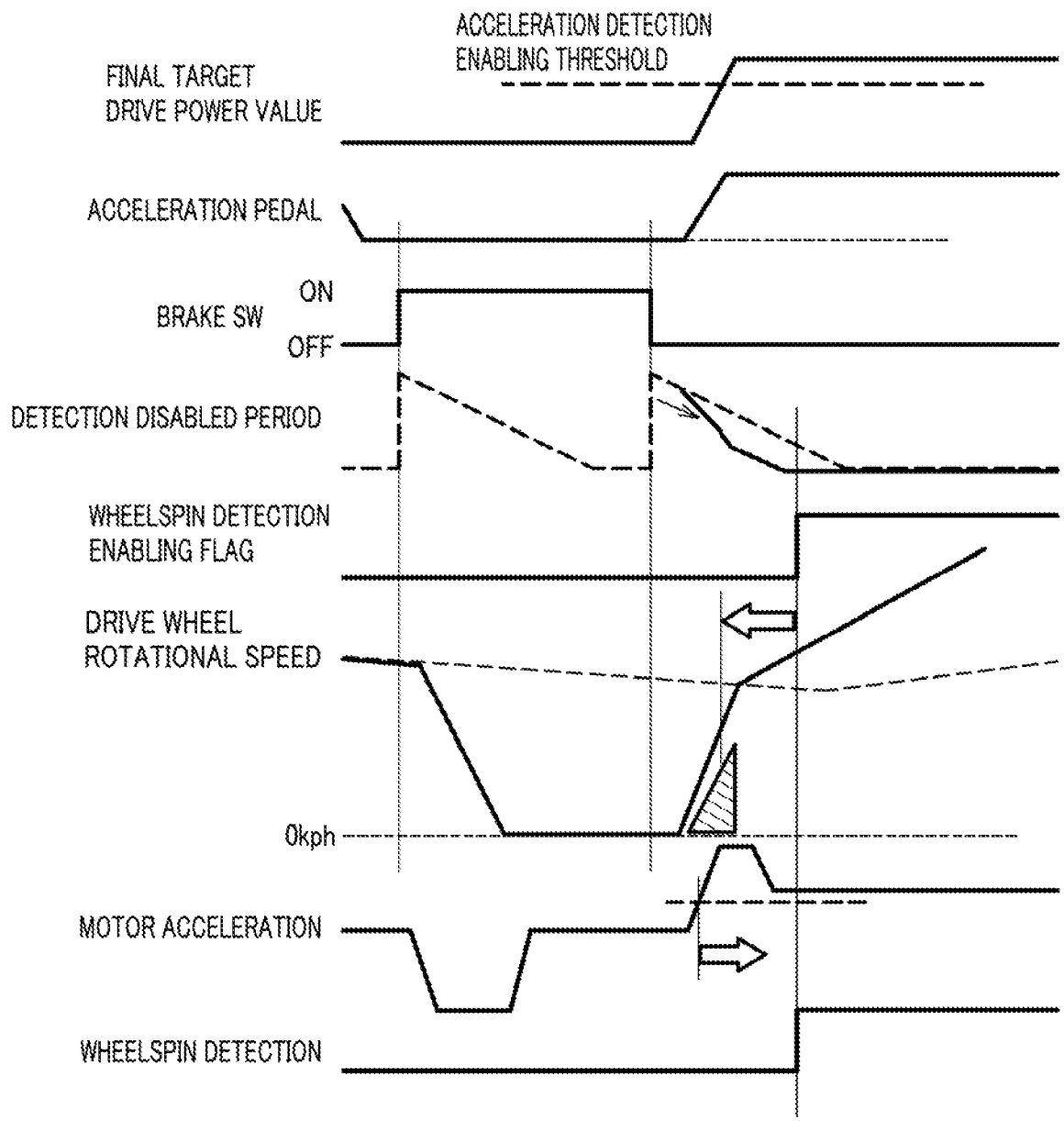
FIG. 5 is a time chart illustrating an example of how the vehicular control apparatus according to the present embodiment works.

Next, using a time chart in FIG. 5, a description is given of a case where the wheels lock up on a low μ road and the vehicle is accelerated immediately after a brake release action.

First, while the vehicle VC is running on what is called a low μ road, the driver removes the foot from the acceleration pedal PDA and steps on the brake pedal BR1 (a brake action).

If the VSA is not properly working, the wheels W lock up, resulting in the vehicle VC sliding on the road surface.

If the driver removes the foot from the brake pedal BR1 (a brake release action) in such a sliding state, the wheels W are unlocked and start rotating again due to the friction with the road surface, and the rotational speed of the wheels W follows the vehicle speed and is accelerated (follow-up acceleration).

Meanwhile, the time measurement unit 20 starts measuring time as soon as the driver removes the foot from the brake pedal BR1.

At the moment the driver removes the foot from the brake pedal BR1, the foot of the driver is off the acceleration pedal PDA, and no drive power is outputted from the engine E. Thus, the control unit 40 sets the longest detection disabled period.

Thus far, the time chart is the same as the time chart in FIG. 4 described above.

What is different from the time chart in FIG. 4 is the timing of the acceleration action by the driver.

This time chart represents a scenario where the driver steps on the acceleration pedal PDA immediately after removing the foot from the brake pedal BR1.

In this case, a detection disabled period corresponding to the drive power newly detected is shorter than the remaining period of the current detection disabled period, and thus the control unit 40 uses the detection disabled period corresponding to the drive power newly detected.

Note that while the amount of depression of the acceleration pedal PDA is increasing, the drive power outputted increases. Thus, while the amount of depression of the acceleration pedal PDA is increasing, the detection disabled period applied keeps getting shorter and shorter. When the amount of depression of the acceleration pedal PDA becomes constant, the drive power outputted becomes constant, and then the detection disabled period is no longer updated.

Then, after the detection disabled period elapses, the control unit 40 confirms that the drive power is above the acceleration detection enabling threshold and enables the wheelspin detection unit 10 to detect wheelspins. This is the same as the time chart described above.

Figure 6:
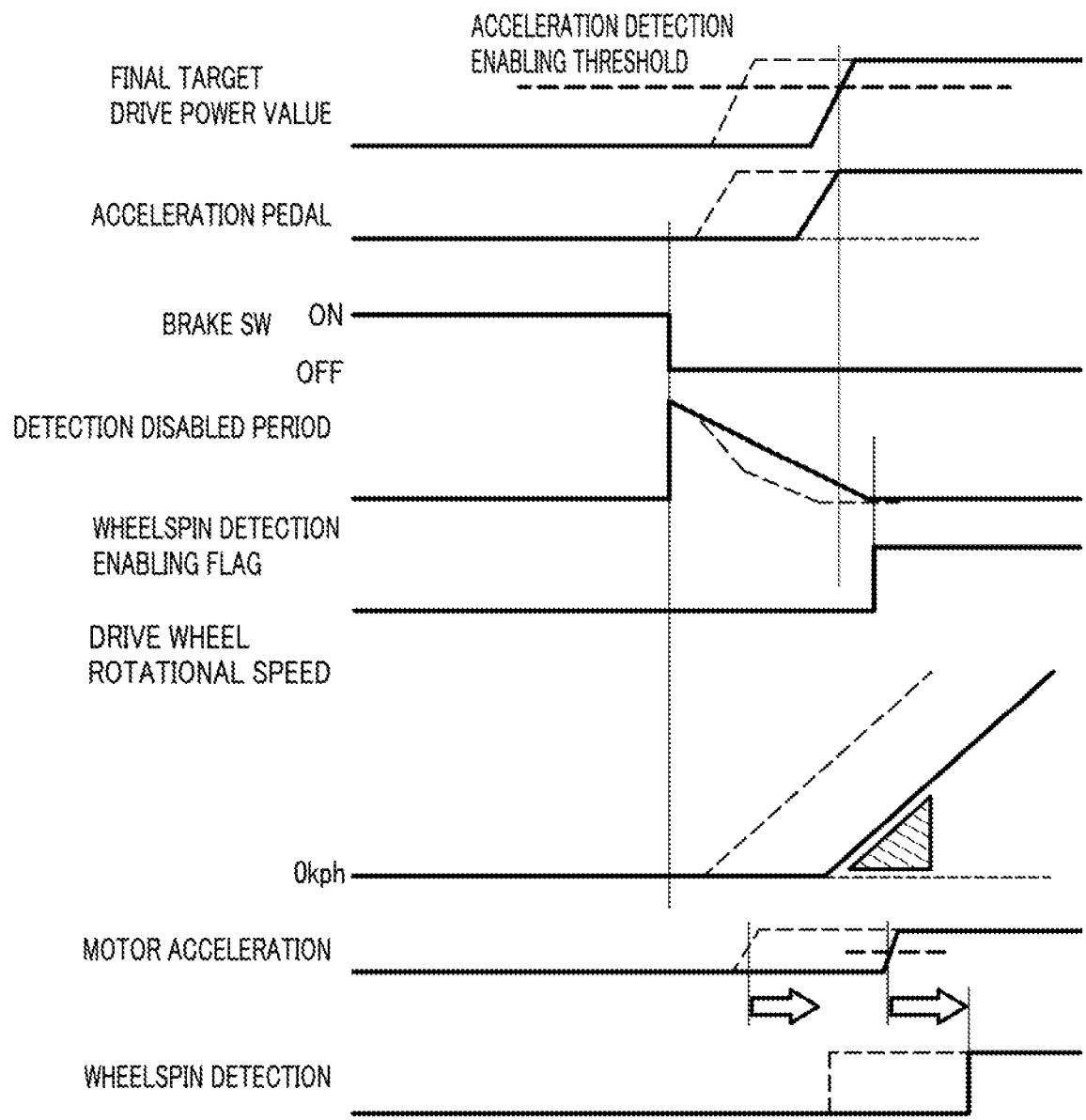
FIG. 6 is a time chart illustrating an example of how the vehicular control apparatus according to the present embodiment works.

Next, using a time chart in FIG. 6, a description is given of a case where the vehicle stopped on a low μ road takes off. When the vehicle VC is stopped on a road surface, the driver's foot is off the acceleration pedal PDA and is stepping on the brake pedal BR1.

Then, the time measurement unit 20 starts measuring time as soon as the driver removes the foot from the brake pedal BR1.

At the moment the driver removes the foot from the brake pedal BR1, the driver's foot is off the acceleration pedal PDA.

Thus, no drive power is outputted from the engine E, and therefore the control unit 40 sets the longest detection disabled period.

<<Case where the Driver Performs an Acceleration Action Some Time after Removing the Foot from the Brake Pedal BR1 (Cf. The Solid Line in FIG. 6)>>

If the remaining time of the current detection disabled period is shorter than a detection disabled period corresponding to the drive power generated by the acceleration action, the control unit 40 does not replace the detection disabled period and waits for the remaining time to elapse.

Then, once the detection disabled period elapses, the control unit 40 confirms that the drive power is above the acceleration detection enabling threshold and enables the wheelspin detection unit 10 to detect wheelspins.

<<Case where the Driver Performs an Acceleration Action Immediately after Removing the Foot from the Brake Pedal BR1 (Cf. The Broken Line in FIG. 6)>>

If a detection disabled period corresponding to the drive power generated by the acceleration action is shorter than the remaining time of the current detection disabled period, the control unit 40 applies the detection disabled period corresponding to the new drive power as a new detection disabled period.

Since the drive power outputted increases while the amount of depression of the acceleration pedal PDA is increasing, the detection disabled period applied keeps getting shorter and shorter while the amount of depression of the acceleration pedal PDA is increasing.

When the amount of depression of the acceleration pedal PDA becomes constant, the drive power outputted becomes constant, and then the control unit 40 no longer updates the detection disabled period.

Then, after the detection disabled period elapses, the control unit 40 confirms that the drive power is above the acceleration detection enabling threshold and enables the wheelspin detection unit 10 to detect wheelspins. This is the same as the case described above.

Figure 7:
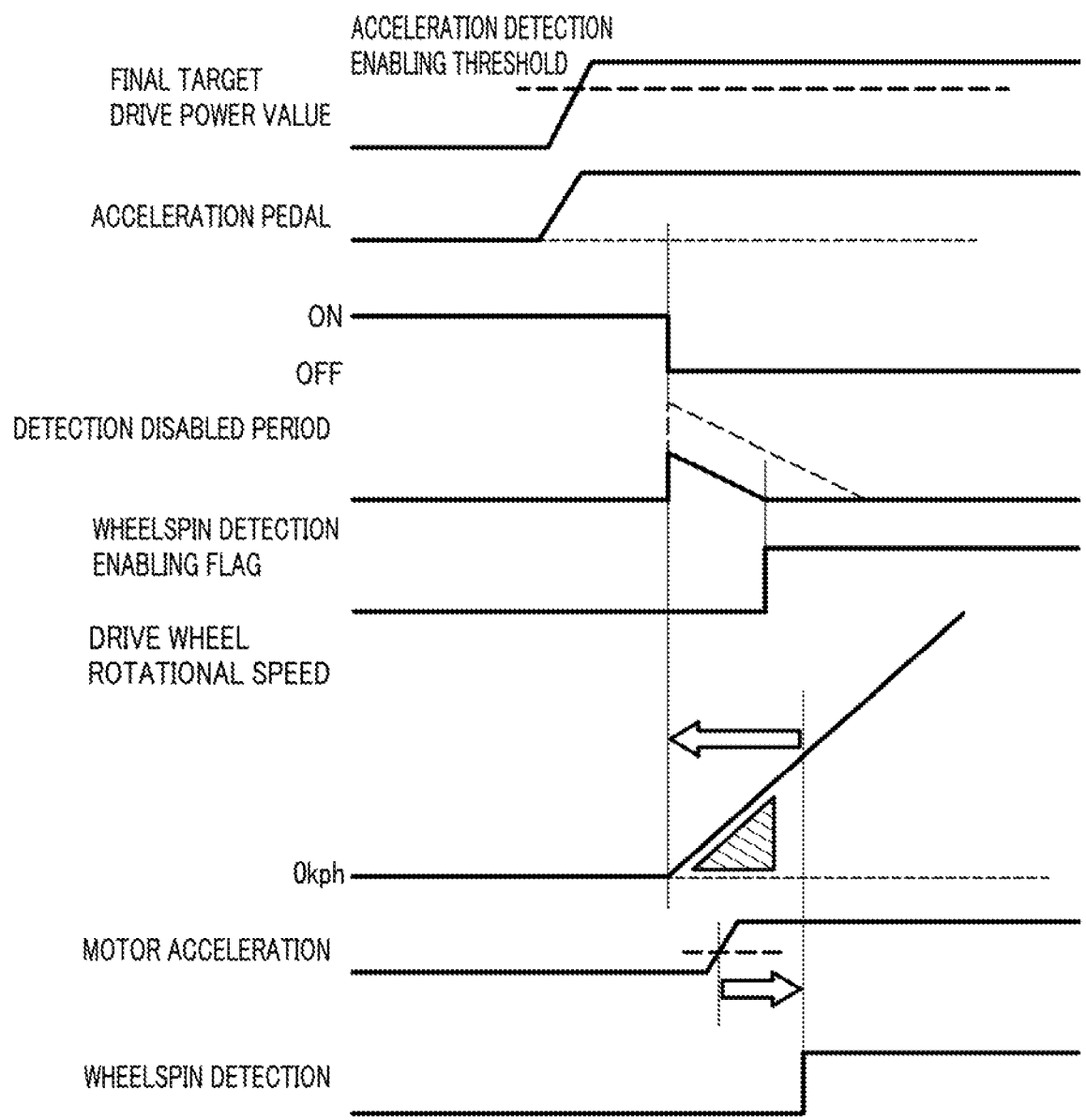
FIG. 7 is a time chart illustrating an example of how the vehicular control apparatus according to the present embodiment works.

Next, using a time chart in FIG. 7, a description is given of a case where the vehicle stopped on a low μ road makes a stall start.

To make a stall start, the driver in the stopped vehicle steps on the brake pedal BR1 with one foot and steps on the acceleration pedal PDA with the other foot. Then, to take off, the driver removes the foot from the brake pedal BR1 with the other foot still stepping on the acceleration pedal PDA.

Then, the time measurement unit 20 starts measuring time as soon as the driver removes the foot from the brake pedal BR1.

In a stall start, drive power above the acceleration detection enabling threshold is already outputted in a stopped state before the vehicle takes off. Thus, the control unit 40 sets the shortest detection disabled period.

After the detection disabled period elapses, the control unit 40 enables the wheelspin detection unit 10 to detect wheelspins.

Note that upon detection of a wheelspin, the control unit 40 instructs the drive power control unit 30 to apply a braking force to the drive wheels WFL, WFR. Then, the wheelspin of the drive wheels WFL, WFR is resolved by the braking force thus applied.

<4. Flowchart>

Figure 8:
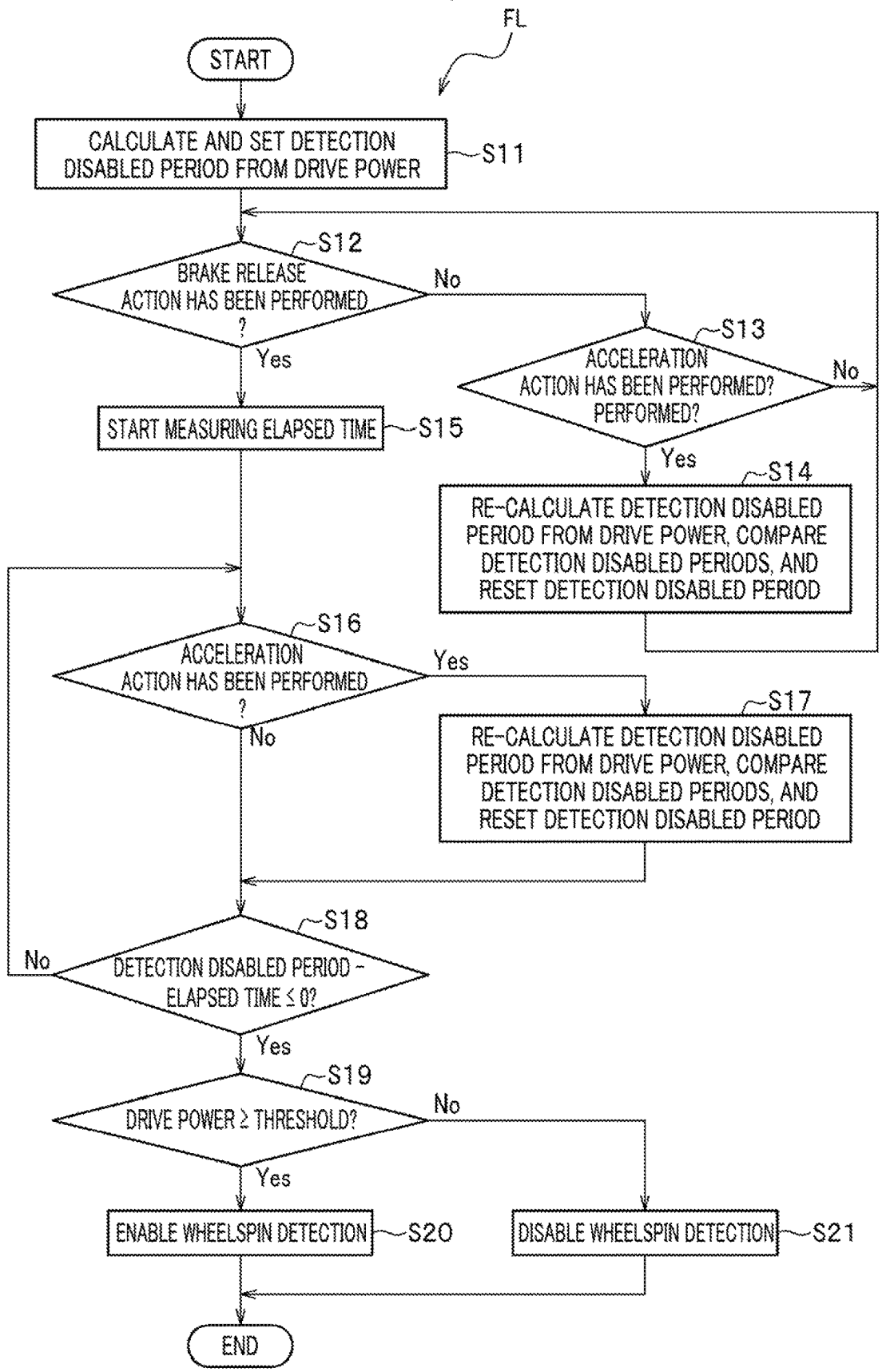
FIG. 8 is a time chart illustrating an example of how the vehicular control apparatus according to the present embodiment works.

The control unit 40 performs the control in the above time charts according to a flowchart FL in FIG. 8.

During normal running, the vehicle VC is controlled by a main flow (not shown) set separately from the flowchart FL. Then, during the control in accordance with the main flow, the flowchart FL is executed when the wheels W stop rotating due to a brake action.

In Step S11, the drive power detection unit 31 detects drive power outputted from the drive unit PW. Then, the length of time for disabling wheelspin detection (a detection disabled period) is calculated and set based on the magnitude of the drive power detected, and the flowchart proceeds to Step S12.

In Step S12, it is determined whether a brake release action (an action of removing the foot from the brake pedal BR1) has been performed. Then, the flowchart proceeds to Step S15 if a brake release action has been performed, or proceeds to Step S13 if a brake release action has not been performed.

In Step S13, it is determined whether an acceleration action has been performed without a brake release action. Then, the flowchart proceeds to Step S14 if an acceleration action has been performed, or proceeds back to Step S12 if an acceleration action has not been performed.

In Step S14, drive power outputted from the drive unit PW is detected again, and the length of time for disabling wheelspin detection (a detection disabled period) is calculated based on the magnitude of the detected drive power and is then compared with the current detection disabled period. Then, the shorter detection disabled period determined by the comparison is set as a new detection disabled period, and the flowchart proceeds to Step S12.

Steps S13 and S14 are iterated until a brake release action is performed.

In Step S15, the time measurement unit 20 starts measuring time elapsed since the brake release action has been performed.

In Step S16, it is determined whether an acceleration action has been performed. Then, the flowchart proceeds to Step S17 if an acceleration action has been performed, or proceeds to Step S18 if an acceleration action has not been performed.

In Step S17, drive power outputted from the drive unit PW is detected again, and the length of time for disabling wheelspin detection (a detection disabled period) is calculated based on the magnitude of the detected drive power and is then compared with the remaining time of the current detection disabled period. Then, the shorter detection disabled period determined by the comparison is set as a new detection disabled period, and the flowchart proceeds to Step S18.

In Step S18, the detection disabled period is compared with the elapsed time measured by the time measurement unit 20 to determine whether the detection disabled period has elapsed. The flowchart proceeds to Step S19 if the detection disabled period has elapsed, or proceeds to Step S16 if the detection disabled period has not elapsed.

In other words, Step S17 is iterated until the detection disabled period elapses.

In Step S19, it is determined whether the drive power outputted from the drive unit PW exceeds an acceleration detection enabling threshold (a threshold). Then, the flowchart proceeds to Step S20 if the drive power exceeds the acceleration detection enabling threshold, or proceeds to Step S21 if the drive power does not exceed the acceleration detection enabling threshold.

In Step S20, the wheelspin detection unit 10 is enabled to detect wheelspins.

In Step S21, the wheelspin detection unit 10 is not enabled to detect wheelspins.

Then, after Step S20 or S21, the flowchart FL is ended and proceeds to the main flow.

Next, advantageous effects of the vehicular control apparatus 1 according to the present mode are described.

In the present embodiment, when the drive wheels WFL, WFR start rotating under hard acceleration from a stopped state, wheelspin detection is not performed during a detection disabled period, and wheelspin detection is enabled only after an elapse of the detection disabled period.

Thereby, without provision of special equipment for wheelspin detection, a wheelspin can be distinguished from follow-up acceleration, and erroneous wheelspin detection can be reduced.

Further, when it is determined as follow-up acceleration, the rotation of the drive wheels WFL, WFR under hard acceleration ends within the detection disabled period. Thus, the control unit 40 does not perform drive power restriction.

This allows the driver to perform a regular acceleration action immediately after the follow-up acceleration, without feeling any awkwardness.

By contrast, when it is determined as a wheelspin, the drive wheels WFL, WFR keep rotating under hard acceleration even after the detection disabled period.

Thus, for a wheelspin, the control unit 40 applies a braking force to the wheels W to restrict drive power. This allows the occurring wheelspin to be controlled and resolved speedily.

In the present embodiment, a condition used in determination of whether to enable wheelspin detection takes the magnitude of drive power into consideration.

Specifically, the wheelspin detection unit 10 is enabled to detect spinning of the drive wheels WFL, WFR if drive power detected by the drive power detection unit 31 is above a preset acceleration detection enabling threshold. If drive power detected by the drive power detection unit 31 is equal to or below the acceleration detection enabling threshold, the probability of a wheelspin occurring is low, and therefore wheelspin detection is not performed.

This way, even if follow-up acceleration is continuing after an elapse of the detection disabled period for some reason, such as the road surface having an extremely small coefficient of friction, follow-up acceleration and wheelspin can be distinguished from each other.

In the present embodiment, the larger the drive power detected by the drive power detection unit 31 immediately before the time measurement unit 20 starts measuring time is, the shorter the detection disabled period set by the control unit 40 is.

Thus, at a stall start, the detection disabled period is shortened, and wheelspin determination can be started promptly.

This helps prevent the driver from causing a wheelspin on purpose, without affecting regular wheelspin detection.

In the present embodiment, the control unit 40 holds detection disabled periods for respective amounts of acceleration action. Then, when an acceleration action is performed during a detection disabled period, the current detection disabled period is compared with a detection disabled period corresponding to the amount of the acceleration action, and the shorter one of these detection disabled periods is set.

This causes the detection disabled period to be set according to the largest drive power in the acceleration action range, and therefore allows wheelspin detection to be performed speedily.

What is claimed is:

1. A vehicular control apparatus comprising:
   a drive power control unit configured to control a drive power from a drive unit that drives a drive wheel of a vehicle;
   a brake action detection unit configured to detect a plurality of brake actions performed on a brake unit, the plurality of brake actions including: (a) a first brake action of decelerating and stopping the vehicle, and (b) a second brake action of brake release;
   a wheelspin detection unit configured to detect whether or not a difference in a first spinning speed of the drive wheel and a second spinning speed of a non-drive wheel is equal to or greater than a set value tolerance indicative of a wheelspin;
   a drive power detection unit configured to detect a magnitude of the drive power from the drive unit in an iterative manner; and
   a control unit configured to:
      set a detection disabled duration in correlation with the magnitude of the drive power in an iterative manner such that the detection disabled duration is adjusted to a reduced duration when the drive power iteratively detected by the drive power detection unit is increased, wherein the detection disabled duration is a no wheelspin detection time period in which the wheelspin detection unit is prohibited from detecting the wheelspin, wherein the control unit sets the detection disabled duration when the drive wheel stops rotating in response to the first brake action of decelerating and stopping the vehicle,
      start incrementing an internal timer that measures a post-stop-brake-release time period when the second brake action of brake release is detected as being performed after the drive wheel has stopped rotating to conclude the first brake action of decelerating and stopping the vehicle, and
      enable the wheelspin detection unit to perform detection of the wheelspin only after the measured post-stop brake-release time period of the internal timer exceeds the detection disabled duration.

2. The vehicular control apparatus according to claim 1, further comprising:
   an acceleration action detection unit that detects an acceleration action performed on an accelerator unit, the acceleration action resulting in positive acceleration of the vehicle, wherein
   when the acceleration action is detected by the acceleration action detection unit during the detection disabled duration and changes the magnitude of the drive power detected by the drive power detection unit to a new magnitude, the control unit is further configured to determine a new duration of the detection disabled duration according to the new magnitude, and reduces the detection disabled duration to the new duration when the new duration is less than the detection disabled duration.

* * * * *